United States Patent
Hinds et al.

(10) Patent No.: US 7,896,071 B2
(45) Date of Patent: Mar. 1, 2011

(54) METHOD FOR CONTINOUS DOWNHOLE FLUID RELEASE AND WELL EVALUATION

(76) Inventors: Shane Hinds, Lafayette, LA (US); Randall J. Block, Lafayette, LA (US); Bradley Jay Vincent, Youngsville, LA (US); Joel Hebert, Youngsville, LA (US)

( * ) Notice: Subject to any disclaimer, the term of this patent is extended or adjusted under 35 U.S.C. 154(b) by 0 days.

(21) Appl. No.: 12/156,633

(22) Filed: Jun. 3, 2008

(65) Prior Publication Data
US 2008/0236815 A1   Oct. 2, 2008

Related U.S. Application Data

(63) Continuation-in-part of application No. 11/120,072, filed on May 2, 2005, now abandoned.

(51) Int. Cl.
*E21B 47/00*   (2006.01)
*E21B 49/08*   (2006.01)
*E21B 27/02*   (2006.01)

(52) U.S. Cl. .............. 166/250.01; 166/309; 166/264; 166/90.1; 166/162; 73/152.55

(58) Field of Classification Search ............... 166/90.1, 166/305.1, 309, 310, 162, 169, 250.01, 264; 73/152.54, 152.55
See application file for complete search history.

(56) References Cited

U.S. PATENT DOCUMENTS

| | | | | |
|---|---|---|---|---|
| 3,343,408 A * | 9/1967 | Mayer, Jr. | ................ | 73/152.39 |
| 4,421,166 A * | 12/1983 | Cain | ........................... | 166/162 |
| 5,509,474 A * | 4/1996 | Cooke, Jr. | ..................... | 166/64 |
| 6,945,330 B2 * | 9/2005 | Wilson et al. | ................ | 166/373 |
| 2006/0185847 A1 * | 8/2006 | Saini et al. | ................... | 166/279 |

* cited by examiner

*Primary Examiner*—Daniel P Stephenson
*Assistant Examiner*—Robert E Fuller
(74) *Attorney, Agent, or Firm*—Ted M. Anthony

(57) ABSTRACT

A method and apparatus, capable of being conveyed on wireline, for continuous downhole injection of foaming agent(s) and/or beneficial chemical(s), comprising a reservoir and means for dispensing foaming agent(s) and/or beneficial chemical(s) from the reservoir of such apparatus and into the surrounding wellbore environment.

1 Claim, 4 Drawing Sheets

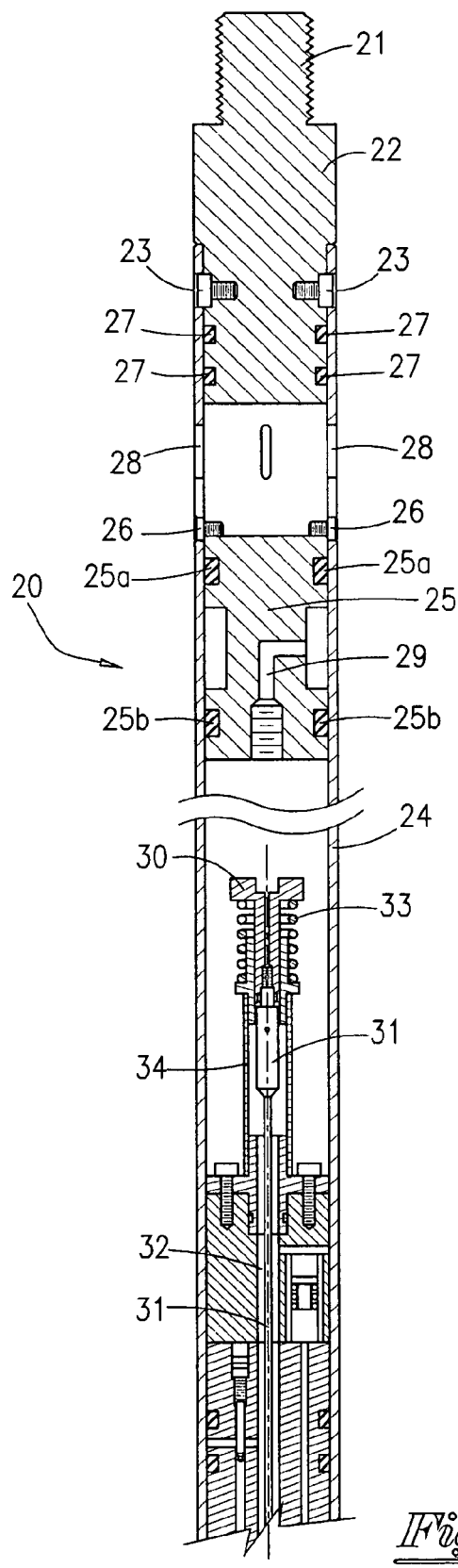
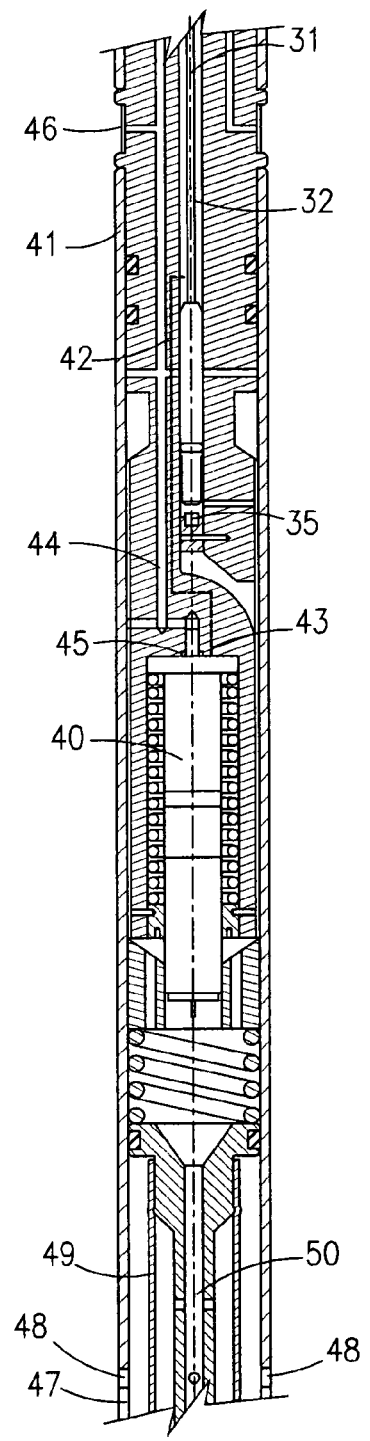
Fig. 3A
Fig. 3B

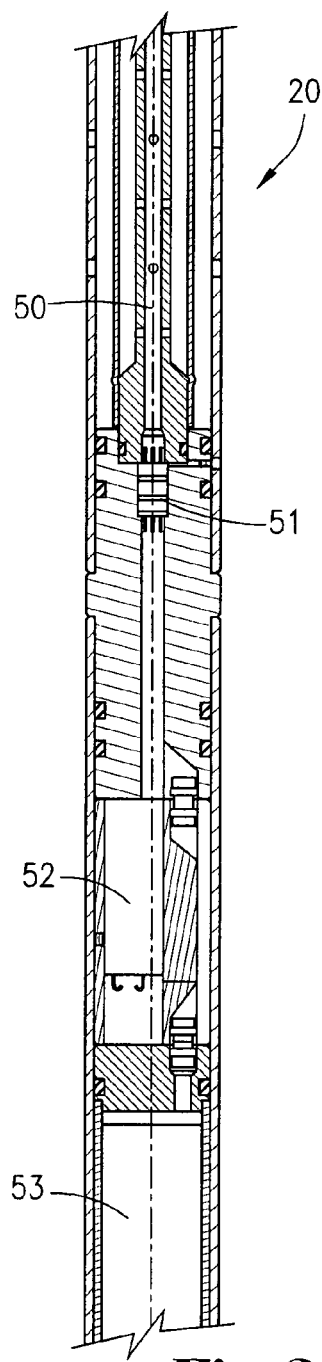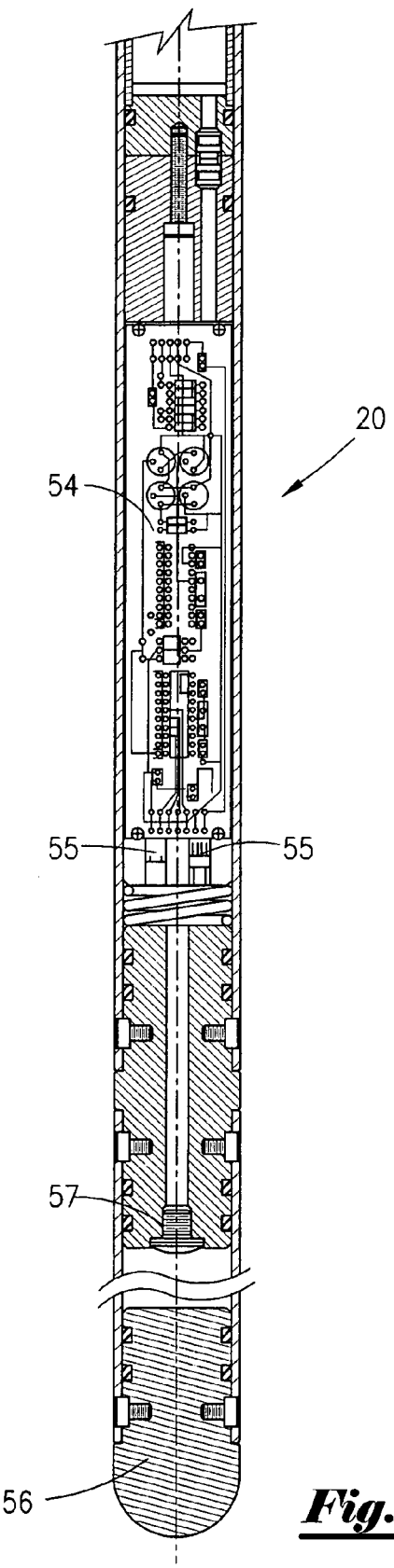

METHOD FOR CONTINOUS DOWNHOLE FLUID RELEASE AND WELL EVALUATION

CROSS REFERENCES TO RELATED APPLICATIONS

This application is a continuation-in-part of United States non-provisional patent application Ser. No. 11/120,072, filed May 2, 2005, currently abandoned

STATEMENTS AS TO RIGHTS TO INVENTIONS MADE UNDER FEDERALLY SPONSORED RESEARCH AND DEVELOPMENT

NONE

BACKGROUND OF THE INVENTION

1. Field of the Invention

The present invention pertains to a method and apparatus for continuous downhole release of fluid(s) in oil or gas wells. More particularly, the present invention pertains to a method and apparatus for continuous downhole release of fluid in oil or gas wells using wireline, including slickline, electric line and/or braided line.

2. Description of the Prior Art

In the oil and gas industry, it is common to introduce fluids into oil or gas wells. Such fluids, which are frequently used during both drilling and production phases, include, but are not limited to, acids, surfactants, corrosion inhibitors and/or other additives or chemicals aimed at improving the drilling process and/or the producing characteristics of a well. Frequently, such fluids can be pumped down a well from the earth's surface and commingled with other fluids in such well. However, in other situations, it is advantageous to introduce such fluids at or near the bottom of a well; that is, the subject fluids are kept isolated from other fluids until they are released into the wellbore environment at a desired downhole location.

As existing oil fields mature, it is becoming increasingly common to inject beneficial chemicals and/or other additives into older oil and gas wells. Hydrocarbon production often decreases in such mature wells while associated salt water production increases. In many cases, this phenomenon is coupled with a decline in reservoir pressure required to lift produced fluids (including the heavier saltwater) from the bottom of a well to the surface. As water production increases, and reservoir pressure decreases, hydrocarbon production is frequently "choked off" and greatly diminished. As a result, it is often desirable to increase the overall production rate from such wells in order to improve recovery of hydrocarbons from the well stream.

One method commonly used to maximize production involves introduction of soap, foaming agent(s) or other similar additive(s) into producing wells in order to create foam. Such foam has the effect of reducing the hydrostatic head created by relatively heavy wellbore fluids such as saltwater. As foam is created and hydrostatic head is reduced, the existing formation pressure has significantly less resistance to overcome, thereby resulting in higher overall producing rates. As such, more overall fluid (and, thus, greater volumes of hydrocarbons) can be produced from such wells, and the wells can produce longer prior to depletion.

In order to generate the greatest reduction in hydrostatic head, it is generally beneficial to introduce such foaming agent at a downhole location near the point that formation fluids enter a wellbore. In most cases, this point is adjacent to, or in general proximity to, the production perforations in a well. Frequently, such production perforations are located at or near the bottom of a wellbore.

Capillary strings are often utilized to carry such foaming agent(s) into a wellbore and release same in the wellbore environment at an optimum down hole location. Such capillary strings prevent undesired commingling of fluids and/or premature foaming action. Such capillary strings, which typically consist of relatively small diameter pipe, can be concentrically disposed within the production tubing of a well. Such capillary strings often extend from the surface of a well to a point at or near the perforations of such well. Although such capillary strings can be made from jointed pipe, in most cases such capillary strings consist of continuous lengths of pipe. Such continuous pipe typically arrives at well sites on spools or coils and it thereafter straightened during the installation process.

Generally, foaming agent(s) and/or other chemicals are pumped down the internal diameter of a capillary string. While inside the capillary string, such foaming agent(s) and/or chemicals remain isolated from other fluids in the wellbore environment. However, when said foaming agent(s) and/or other chemicals reach the lower terminus of the capillary string, the foaming agent(s) and/or other chemicals flow out of said capillary string and come in contact with wellbore fluids, including saltwater. Ideally, such foaming agent(s) and/or other chemicals will mix with such wellbore fluids and generate foam, thereby reducing the hydrostatic head exerted by such wellbore fluids. Because the hydrostatic head of the saltwater is reduced, greater volumes of wellbore fluids (including hydrocarbons) can be produced up the annular space existing between the outer surface of the capillary string and the inner surface of the surrounding production tubing.

Although use of capillary strings in this manner can frequently increase hydrocarbon production, in most cases such capillary strings can be expensive to purchase and install. Moreover, in certain circumstances, wells which initially appear to be ideal candidates for installation of capillary strings do not realize the anticipated results following actual installation of such capillary strings. As such, it is advantageous to have an efficient and inexpensive means of evaluating whether installation of such capillary strings will yield positive results before incurring the expense associated with such actual purchase and installation of such capillary strings.

SUMMARY OF THE INVENTION

The present invention comprises an apparatus for releasing fluids into downhole environments to simulate the effects of capillary strings. In the preferred embodiment, the present invention comprises a method and apparatus which can be lowered into a well to an optimum downhole location. Although it is possible that said apparatus can be conveyed into a well via tubing or pipe, in most instances said apparatus is beneficially conveyed into a well via wireline. Although such wireline can be electric line (that is, line which permits the flow of electricity), the present invention can also be conveyed in and out of wells via slickline. In many situations, use of slickline can be significantly less expensive than electric line or tubing.

The apparatus of the present invention includes a reservoir that can be filled with foaming agent or other desired chemical(s), as well as a means for releasing said foaming agent or chemical(s) from said reservoir at a constant, desired rate into the surrounding wellbore environment. The apparatus of the present invention is typically filled with such desired foaming agents or chemical at the surface. Thereafter, the subject apparatus is lowered into a well (typically within the production tubing) to a target depth that, in most cases, is adjacent to or just above said well's perforations.

Once the apparatus of the present invention is positioned at a desired depth, a trigger mechanism is activated. In the preferred embodiment, such trigger mechanism comprises a timer that is calibrated at the surface prior to running the tool into the well. However, it is to be observed that any number of other known devices can also be used as a trigger mechanism. For example, but not by way of limitation, said trigger mechanism can be activated by temperature, pressure or even jarring of the subject device. Alternatively, when the apparatus of the present invention is conveyed into a well on electric line, the subject trigger mechanism can be electronically activated via such electric line.

Once said trigger mechanism is activated, foaming agents or other chemicals are released from said reservoir through ports in said device. After being released from the device of the present invention, such foaming agents or other chemicals come in contact and mix with wellbore fluids, including produced water. As said foaming agents or other chemicals mix with such saltwater, foam is created. Such foam has the effect of reducing the hydrostatic head of the fluids in the wellbore, which in turn allows greater overall volumes of fluid (including hydrocarbons) to be produced from the wellbore.

After all foaming agents or other chemicals are released from the device of the present invention, such device can be easily retrieved from the wellbore. If desired, the process can be repeated to allow for adequate testing times and to confirm observed results.

Because the apparatus of the present invention can be conveyed via wireline, it can be run into a well, and retrieved from such well, for a fraction of the cost of installing conventional capillary strings. As such, the apparatus of the present invention can be used to inexpensively and efficiently evaluate whether the installation of capillary strings and use of foaming agents and/or other chemicals will yield positive results in connection with particular wells. Wells showing promise through the use of the present invention can, if desired, thereafter be equipped with permanent capillary strings.

Although not specifically required, the apparatus of the present invention can also be equipped with other tools or devices for evaluating wellbore conditions. For example, pressure and/or temperature and/or flow memory tool gauges can also be attached to the apparatus of the present invention, allowing for simultaneous observation and recordation of downhole wellbore conditions before, during and after release of said foaming agents and/or other chemicals from the device of the present invention.

BRIEF DESCRIPTION OF THE DRAWINGS

FIG. 3A depicts a cross-sectional view of the apparatus of the present invention, including a detailed view of the upper region of said apparatus.

FIG. 3B depicts a cross-sectional view of the apparatus of the present invention, including a detailed view of the upper-middle region of said apparatus situated immediately below the portion depicted in FIG. 3A.

FIG. 3C depicts a cross-sectional view of the apparatus of the present invention, including a detailed view of the lower-middle region of said apparatus, situated immediately below the portion depicted in FIG. 3B.

FIG. 3D depicts a cross-sectional view of the apparatus of the present invention, including a detailed view of a lower region of said apparatus, situated immediately below the portion depicted in FIG. 3C.

DETAILED DESCRIPTION OF THE PREFERRED EMBODIMENT(S)

Figure 1:
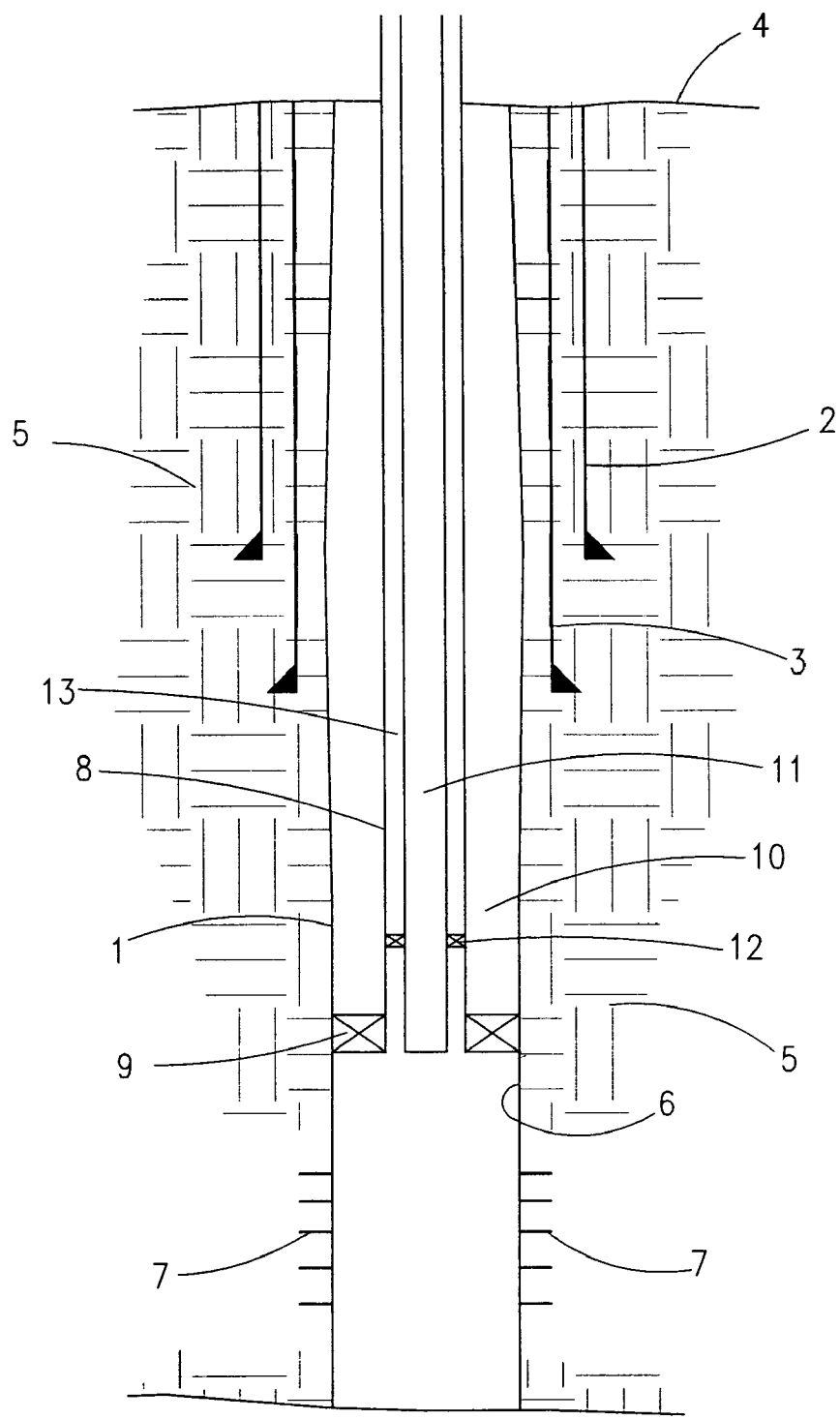
FIG. 1 depicts a schematic view of a wellbore equipped with a prior art capillary string.

Referring to the drawings, FIG. 1 depicts a schematic view of wellbore 1 equipped with a prior art capillary string. Specifically, drive pipe 2 and surface casing 3 extend from earth's surface 4 a desired distance into subterranean strata 5 within the earth's crust. Production casing 6 extends within subterranean strata 5 to a desired total depth. Production perforations 7 permit hydrocarbons and other fluids to flow from subterranean strata 5 into production casing 6. Once inside the production casing, such hydrocarbons and other fluids can be produced up production tubing 8 to earth's surface 4.

Wellbore 1 is equipped with production tubing 8 that is installed concentrically within production casing 6. Said production tubing 8 extends from earth's surface 4 to a point above production perforations 7. Packer 9 anchors the lower portion of production tubing 8 within production casing 6 and seals off annular space 10 existing between the outer surface of production tubing 8 and the inner surface of production casing 6.

Still referring to FIG. 1, wellbore 1 is also equipped with capillary string 11. Said capillary string 11, which has an outer diameter smaller than the inner diameter of production tubing 8, is concentrically disposed within said production tubing 8. Although capillary string 11 is depicted as being slightly smaller in diameter than production tubing 8, it is to be observed that the over diameter of capillary string 11 may be significantly smaller than the diameter of production tubing 8. Said capillary string 11 can be comprised of jointed pipe or a single length of continuous pipe. In most cases capillary string 11 extends from earth's surface 4 to a point above production perforations 7. Although the lower terminus of said capillary string is depicted near the lower terminus of production tubing 8 in FIG. 1, it is to be observed that the lower terminus of capillary string 11 can actually extend out of the bottom of said production tubing 8.

Capillary string 11 is anchored within production tubing 8 using optional hanger 12. Unlike packer 9, hanger 12 does not seal off the annular space 13 existing between the outer surface of capillary string 11 and the inner surface of production tubing 8.

In operation, foaming agent(s) and/or other beneficial chemicals are pumped down the internal diameter of capillary string 11. Such foaming agents and/or other beneficial chemicals exit the lower terminus of capillary string 11, and come in contact with saltwater and/or other wellbore fluids which have entered production casing 6 via production perforations 7.

Said foaming agents react with the relatively heavy saltwater to create foam, thereby reducing the overall hydrostatic head imparted by such saltwater. As a result of such reduction in hydrostatic head, the pore pressure exerted by subterranean strata 5 (which is communicated into wellbore 1 via production perforations 7) is capable of lifting greater volumes of produced fluids from said wellbore. Such "foamed" production is produced from wellbore 1 through annular space 13 formed between the outer surface of capillary string 11 and the inner surface of production tubing 8. As such, overall production—including hydrocarbon production—increases as a result of such foaming action.

Figure 2:
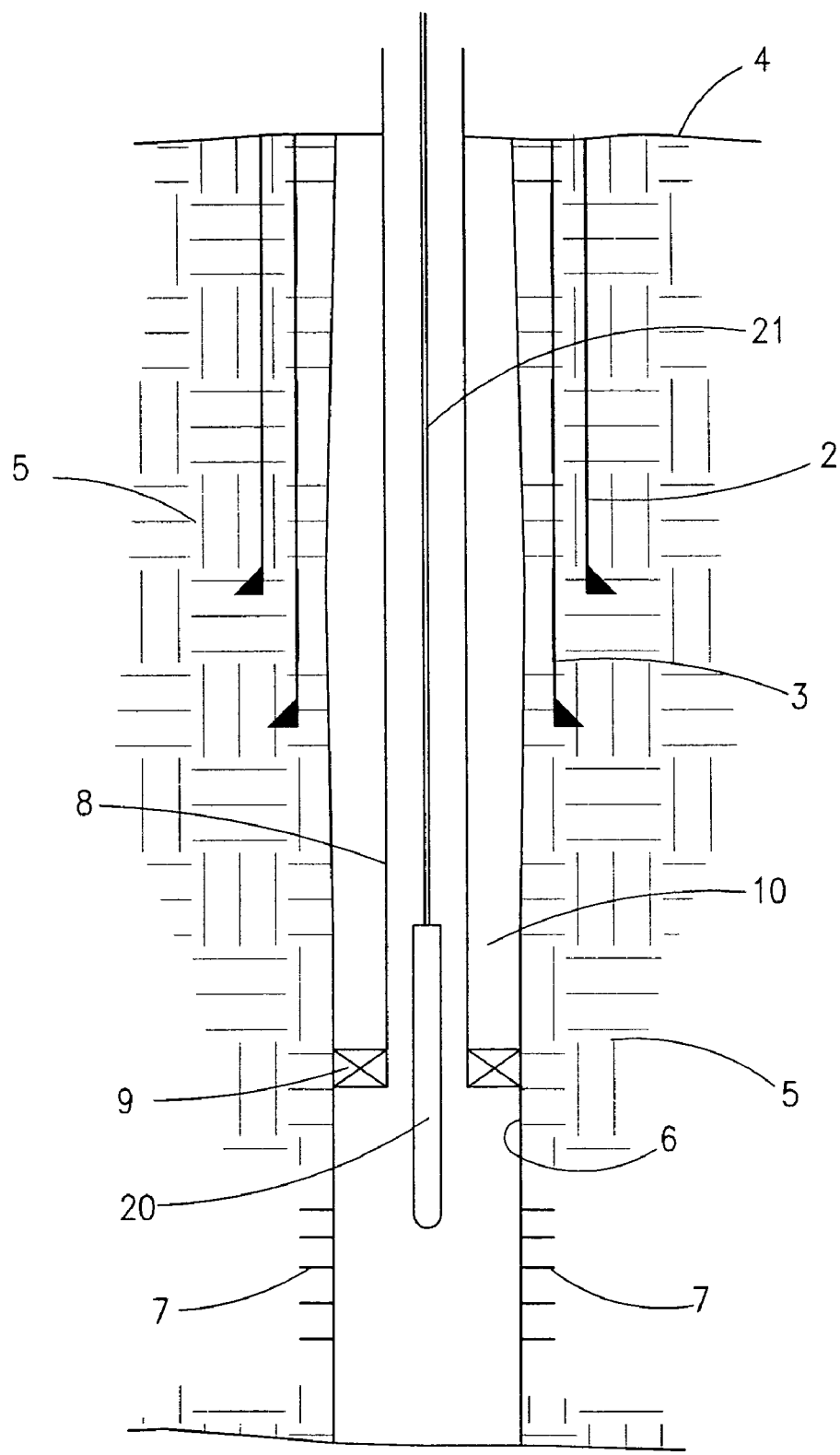
FIG. 2 depicts a schematic view of the apparatus of the present invention installed within a wellbore.

FIG. 2 depicts wellbore 1 having essentially the same configuration as FIG. 1. Specifically, wellbore 1 is equipped with production tubing 8 which is installed concentrically within production casing 6. Said production tubing 8 extends from earth's surface 4 to a point above production perforations 7. Packer 9 anchors the lower portion of production tubing 8 within production casing 6 and seals off annular space 10 existing between the outer surface of production tubing 8 and the inner surface of production casing 6.

Still referring to FIG. 2, there is no capillary string (such as capillary string 11 depicted in FIG. 1) installed within production tubing 8 of wellbore 1. Rather, continuous flow apparatus 20 of the present invention is disposed within said wellbore 1 via wireline 21. Although it is possible that said apparatus can be conveyed into a well such as wellbore 1 via tubing or pipe, in most instances said apparatus is beneficially conveyed into a well via wireline. Although such wireline can be electric line (that is, line which is designed to permit the flow of electricity), the apparatus of the present invention can also be conveyed using slickline (that is, wireline that is not designed to permit the flow of electricity through such line). Although continuous flow apparatus 20 of the present invention is depicted near the lower terminus of production tubing 8 in FIG. 2, it is to be observed that said continuous flow apparatus 20 can actually extend out of the bottom of said production tubing 8.

As described in detail below, continuous flow apparatus 20 contains a reservoir of sufficient dimension and design to accommodate the desired volume of foaming agent(s) and/or other beneficial chemicals. Ports permit communication from said reservoir to the outer surface of continuous flow apparatus 20.

FIG. 3A depicts a detailed cross-sectional view of the upper portion of continuous flow apparatus 20 of the present invention. The upper portion of continuous flow apparatus 20 includes upper connection member 22 having threaded connection 21 extending therefrom. Threaded connection 21 can be connected to a rope-socket or other attachment means to permit connection of continuous flow apparatus 20 to wireline or other means for conveying said continuous flow apparatus 20 into and/or out of a wellbore.

In the preferred embodiment, upper connection member 22 is connected to substantially cylindrical reservoir housing 24 using set screws 23. Traveling piston 25 is slidably disposed within reservoir housing 24. Seal 25a situated on the outer surface of traveling piston 25, provides a pressure-tight seal between the inner surface of reservoir housing 24 and traveling piston 25. Seal 25b acts only as a guide and wiper to prevent foreign material from fouling piston stroke. Piston stops 26 limit upward movement of traveling piston 25 within reservoir housing 24. Elastomer seals 27 provide a pressure-tight seal between upper connection member 22 and reservoir housing 24. Ports 28 extend through reservoir housing 24 above piston stops 26. Pressure communication channel 29 extends partially through the body of traveling piston 25; one end of said pressure communication channel 29 opens between seals 25a and 25b, while the other end of said pressure communication channel 29 extends through the base of said traveling piston 25, preventing atmospheric pressure from being trapped between seals 25a and 25b.

Still referring to FIG. 3A, plunger head 30 is mounted near the base of reservoir housing 24. Plunger head 30 is connected to plunger shaft 31, which in turn extends within fluid intake channel 32. Bias spring 33 is mounted below plunger head 30 and is used to bias plunger head 30 in an extended position. Filter 34 filters fluid passing from the inner chamber of reservoir housing 24 into fluid intake channel 32.

FIG. 3B depicts a detailed cross-sectional view of the upper middle portion of the continuous flow apparatus 20 of the present invention situated immediately below the portion depicted in FIG. 3A. Plunger shaft 31 extends from plunger head 30 (not shown in FIG. 3B) through fluid intake channel 32 to pump cut-off switch 35.

In the preferred embodiment, pump 40 is mounted at the base of reservoir housing 24. Specifically, pump 40 is mounted within pump housing 41, which is in turn sealably attached to reservoir housing 24. Intake channel 42 (shown as a dashed line in FIG. 3B) extends from fluid intake channel 32 to fluid suction port 43 of pump 40. Similarly, output channel 44 extends from output port 45 to discharge ports 46.

Still referring to FIG. 3B, the upper portion of a pressure compensation device having ported sleeve 47 and a plurality of ports 48. Enclosed within said ported sleeve 47 is flexible membrane 49. In the preferred embodiment, flexible membrane 49 is filled with a non-conductive, non-compressible and non-corrosive fluid, such as a silicone-based oil. Electrical connection conduit 50 extends through said flexible membrane 49 and the fluid contained therein.

FIG. 3C depicts a cross-sectional cut-away view of the lower-middle portion of the continuous floor apparatus of the present invention, said portion being immediately below the area depicted in FIG. 3B. Electrical connection conduit 50 ties in to pressure bulkhead connector 51. Below pressure bulkhead connector 51 is elapsed time indicator 52, which is in turn electrically connected to power supply 53 during pump 40 operation (illustrated in FIG. 3B). In the preferred embodiment, said power supply 53 comprises a battery pack having a plurality of batteries.

FIG. 3D depicts a cross-sectional cut-away view of the bottom portion of the continuous flow apparatus of the present invention. Such bottom portion includes printed circuit board ("PCB") 54. Said PCB controls multiple functions of the continuous flow apparatus of the present invention. Below PCB 54 are operator controls 55, and bottom bull plug 56. In the preferred embodiment of the present invention, vent plug 57 is also included. Additionally, at least one pressure bulkhead and/or memory tool housing can also be included.

In operation, an appropriate well is selected as a candidate for installation of a concentric capillary string. Although there are any number of characteristics which can be considered as part of this inquiry, in many cases such a candidate would exhibit relatively low reservoir pressure and accompanying water production.

Prior to being conveyed into a well, the continuous flow apparatus of the present invention is filled with the desired volume of foaming agent or other chemical. Specifically, the desired amount of such foaming agent or other chemical(s) are loaded into reservoir housing 24. Additionally, desired parameters are set on PCB 54 using operator controls 55. Such parameters include, but are not necessarily limited to, motor run time, flow rate, etc.

Once loaded, the continuous flow apparatus of the present invention is lowered to a desired depth within such well. Although the apparatus of the present invention can be positioned at many different depths within such well, in many cases such apparatus will be lowered to a position immediately above the production perforations of such well. In the preferred embodiment, the apparatus of the present invention is conveyed into such well on wire line, such as slick line; however, it is to observed that such apparatus can also be conveyed using other methods such as, for example, coiled tubing, electric line, or the like.

Once triggered, pump 40 of the present invention is activated. Foaming agent or other desired chemical is pumped from reservoir housing 24 and out of the tool via fluid discharge ports 46. Said foaming agent or other desired chemical exits the tool and enters the wellbore environment where it mixes with wellbore fluids.

As fluid is pumped from reservoir housing 24, traveling piston 25 travels downward within said reservoir housing 24. In the event that such fluid is completely pumped from reservoir housing 24, traveling piston 25 will come in contact with plunger head 30. Downward force exerted by traveling piston 25 on plunger head 30 will translate to pump cut-off switch 35. In the event that traveling piston 25 fails to actuate cut-off switch 35 for any reason, PCB 54 is ideally programmed to deactivate pump 40 at a predetermined time.

As traveling piston 25 moves downward within reservoir housing 24, fluids contained within the wellbore in the vicinity of continuous flow apparatus 20 are drawn into reservoir housing 24. In most cases, said continuous flow apparatus 20 is positioned at or near production perforations in said well bore. Accordingly, in such instances, continuous flow apparatus 20 can obtain a down hole sample of formation fluids produced into the well bore through said perforations, often as a result of the beneficial action of the foaming agent or other fluid being pumped from said continuous flow apparatus 20. Any such sample is taken over the same general period of time that pump 40 is running and foaming agent or other fluid is being pumped out of reservoir housing 24.

As foaming agents or other fluids mix and interact with wellbore fluids, the effect of such foaming agents and/or other fluids can be evaluated. Although the effect of the foaming agents and/or other chemicals can be observed in different manners, in most cases the well is allowed to produce during the period that such foaming agent and/or other fluid is being pumped out of said continuous flow apparatus 20. The producing characteristics of the well are observed and recorded. Such producing characteristics include, but are not necessarily limited to, production flow rate, flowing tubing pressure, gas-oil ratio and water cut. In the event that results are obtained indicating that continuous injection of foaming agents or other fluids will improve production, a capillary string can be installed in the subject well. However, if such results are not obtained, the well operator can avoid the cost and expense associated with installation and operation of an actual capillary string.

Additionally, after the tool is retrieved from a well, fluid sample(s) obtained from the downhole environment in the well can be obtained from the reservoir of the tool and analyzed, either in the field or in a laboratory. Although any number of factors can be observed, such samples may indicate the presence of produced sand, foreign objects, contaminants or other factor(s) (such as, for example, high or low salinity formation water, extreme temperatures or unexpected chemical composition of produced fluids) that may impact the performance of foaming agents and/or use of capillary strings. Such information may be helpful in designing future or subsequent uses of the tool of the present invention, or a capillary string to be installed in such well. In some cases, such information may also indicate that a particular well is not a good candidate for installation of a capillary string.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A method of evaluating foaming agent in a well comprising:
   a. loading foaming agent into a container, wherein said container further comprises:
      i. a reservoir;
      ii. at least one outlet port;
      iii. at least one inlet port;
      iv. a conduit, connecting said reservoir to said at least one outlet port;
      v. an electric pump; and
      vi. at least one power supply for said pump;
   b. lowering said container to a desired depth within a well on slickline;
   c. actuating said electric pump;
   d. continuously pumping said foaming agent from said reservoir, through said conduit and out said at least one outlet port of said container into said well;
   e. measuring the flow rate of hydrocarbons or water produced from said well during said pumping step;
   f. drawing a fluid sample from the well into said reservoir during said pumping step; and
   g. retrieving said container from said well.

* * * * *